Oct. 1, 1968 K. C. CASKEY 3,403,760
AIR COOLED, COMPOSITE ROTOR FOR DISK BRAKES
Filed Feb. 20, 1967 3 Sheets-Sheet 1

INVENTOR.
Kenneth C. Caskey
BY
Harness, Dickey & Pierce
ATTORNEYS.

Oct. 1, 1968 K. C. CASKEY 3,403,760
AIR COOLED, COMPOSITE ROTOR FOR DISK BRAKES
Filed Feb. 20, 1967 3 Sheets-Sheet 2

INVENTOR.
Kenneth C. Caskey
BY
Harness, Dickey & Pierce
ATTORNEYS.

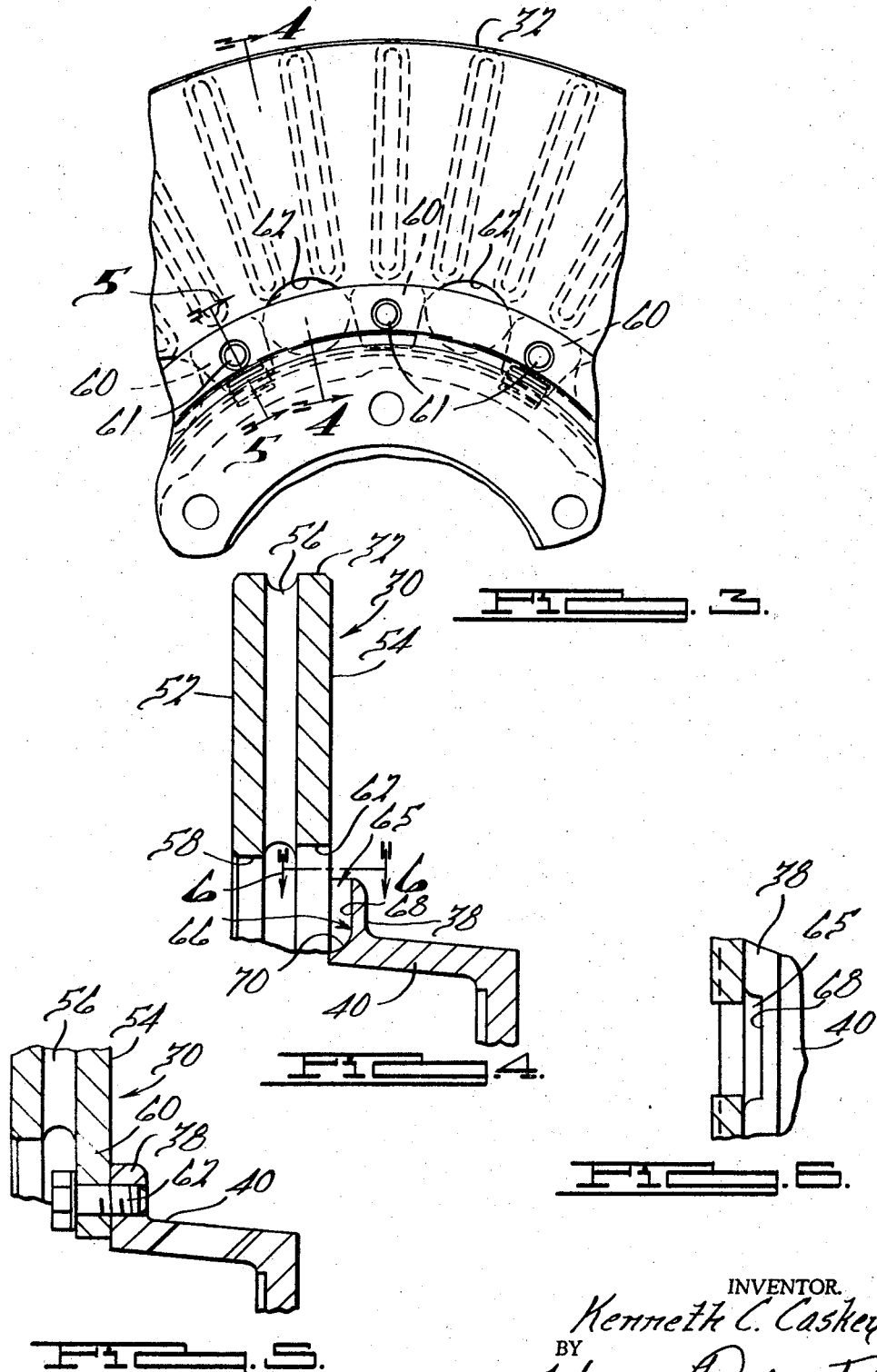

United States Patent Office 3,403,760
Patented Oct. 1, 1968

3,403,760
AIR COOLED, COMPOSITE ROTOR FOR DISK BRAKES
Kenneth C. Caskey, Livonia, Mich., assignor to Kelsey-Hayes Company, Romulus, Mich., a corporation of Delaware
Filed Feb. 20, 1967, Ser. No. 617,134
4 Claims. (Cl. 188—218)

ABSTRACT OF THE DISCLOSURE

A composite rotor for a disk brake in which a disk that has braking faces engageable with brake shoes of a disk brake is detachable from a member attached to a rotatable hub so that the disk may be replaced easily and without a great amount of effort on the part of an automotive mechanic. The disk of the composite rotor adapted to be engaged by brake shoes includes in combination with the other member means for forcing cooling air through the portion of the disk having the brake shoe engaging faces so that cooling air may be supplied across both of the braking faces. The aforementioned abstract is neither intended to define the invention of the application which of course is measured by the claims, nor is it intended to be limiting as to the scope of the invention in any way.

BACKGROUND OF THE INVENTION

Field of the invention

This invention pertains to a two-piece rotor for a disk brake in which a braking disk is detachable from the othe member adapted to be mounted on a rotatable hub of a wheel.

Summary of this invention

This invention relates to a two-piece rotor for a disk brake and the combination of this two-piece rotor with a wheel structure. In certain arrangements of wheel structures that include disk brakes having a rotor adapted to be engaged by brake shoes, the rotor often wears to an extent that makes it necessary for replacement. This wear may take many forms, including mechanical wear and thermal fatigue wear caused by high-speed operation of the vehicle on which the rotor and the brake are mounted. A particular problem exists in racing vehicles where braking may be employed to reduce the speed of the vehicles from very high speeds occurring on the straightaways of a race course to speeds which will permit the vehicle to be moved through the turns on the race course. Under these conditions, the disk brake and particularly the rotor of the brake may attain very high temperatures, and as the brakes are alternately applied and released, the temperature of the rotor attached to the wheel and adapted to be engaged by the brake shoes may cycle in temperature through very extreme ranges. This causes thermal fatiguing of the rotor and may thereby destroy it for all useful purposes after a short period of time. It becomes necessary, therefore, to replace these rotors at frequent intervals. Furthermore, inadequate cooling of the face of the rotor adjacent the wheel may amplify these thermal fatigue problems and may also cause severe wear of the lining of the brake shoe adapted to engage this face.

The present invention provides means for readily solving the above-mentioned problem by providing a composite or two-piece rotor in which one member is attached to a rotatable hub of a wheel and the other member or the disk to be braked is attached to the first piece by means which may readily and easily be reached by an automotive mechanic. As a result, only the disk to be braked need be replaced when it has served its useful life. Furthermore, the invention provides a means for forcing cooling air through the portion of the composite rotor that its adapted to be engaged by the brake shoes in a direction generally perpendicular to the braking faces and for forcing cooling air over the faces of the portion of the rotor adapted to be engaged by the brake shoes so that cooling air may reach both faces of this portion of the rotor.

The invention may more readily be understood by reference to the attached drawings, in which:

FIG. 3 is a sectional view taken along the lines 3—3 of FIG. 2;

FIG. 4 is a sectional view taken along the lines 4—4 of FIG. 3;

FIG. 5 is a sectional view taken along the lines 5—5 of FIG. 3;

FIG. 6 is a sectional view taken along the lines 6—6 of FIG. 4; and

Figure 1:
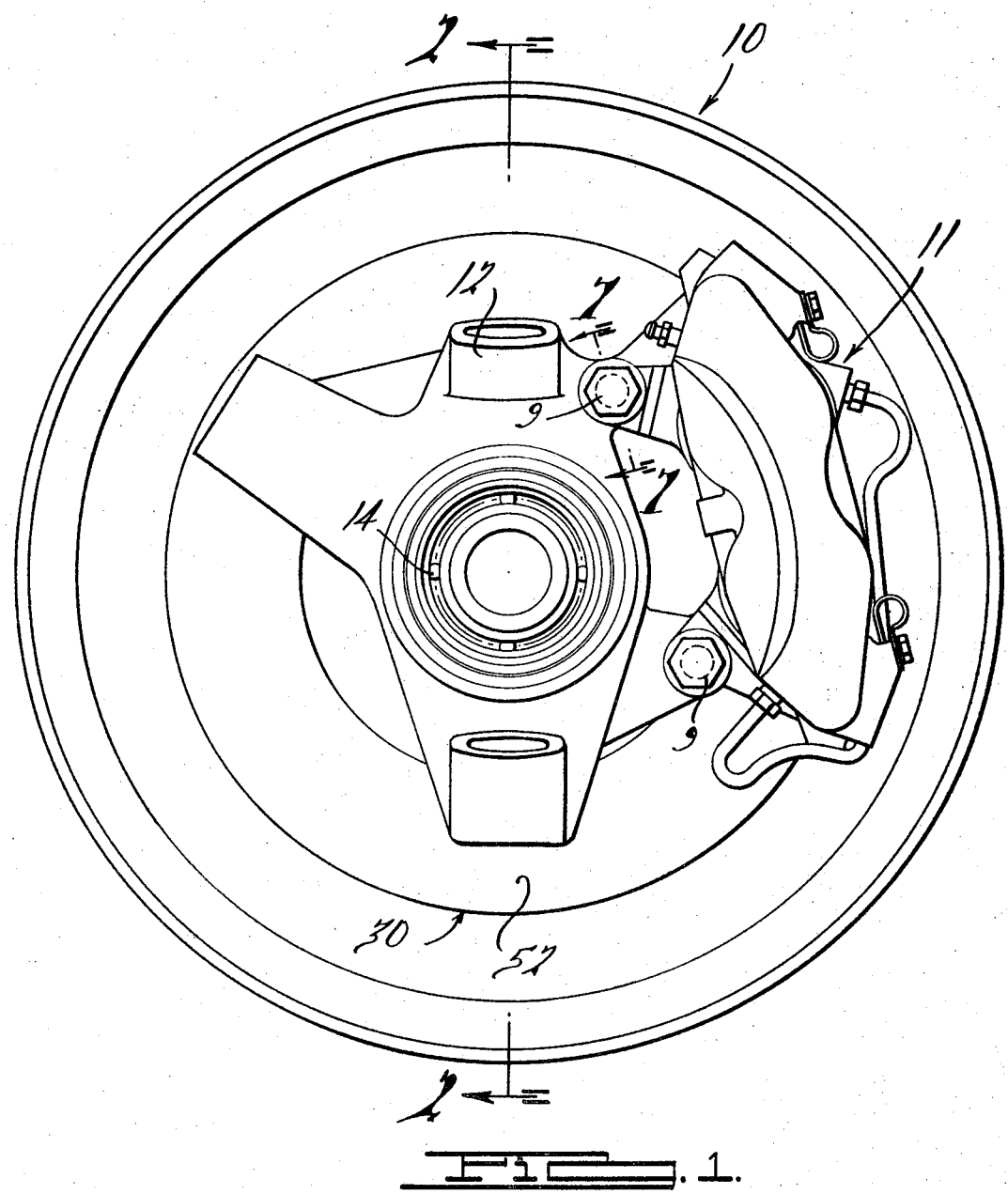
FIGURE 1 is a front elevational view of a wheel structure including a disk to be braked and a disk brake mechanism which is adapted to apply a braking force to the disk.

Referring now to the drawings in which like reference numerals designate like parts throughout the several views thereof, there is shown in FIG. 1 a wheel structure 10 having a disk brake arrangement 11 associated therewith. The wheel structure comprises a stationary mounting means 12 which is adapted to be connected to a stationary portion of the vehicle for supporting the wheel structure on the vehicle chassis. The disk brake 11 is conventional and is mounted on the stationary mounting means 12 by a pair of machine screws 9.

Figure 2:
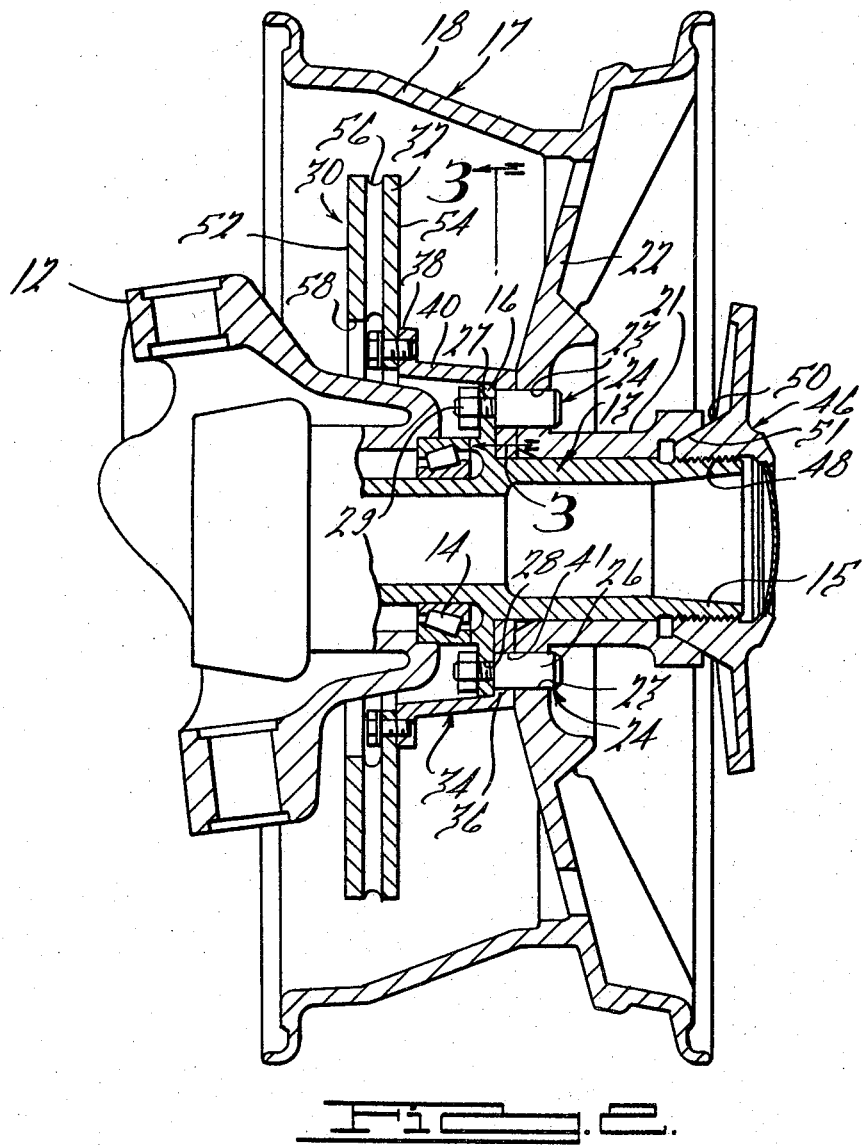
FIG. 2 is a sectional view taken along the lines 2—2 of FIG. 1.
Figure 7:
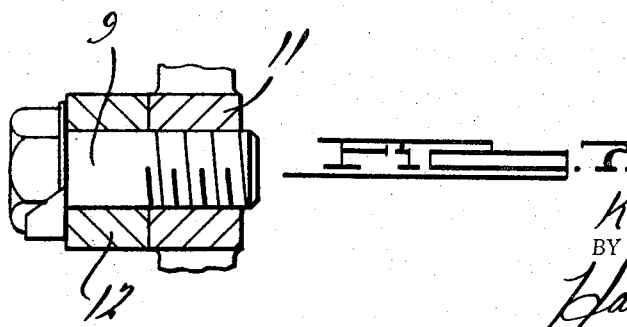
FIG. 7 is a sectional view taken along the lines 7—7 of FIG. 1.

Referring now to FIG. 2, a rotatable hub or sleeve 13 is rotatably mounted on the stationary member 12 by antifriction bearing means, one of which is shown at 14 (see FIG. 2). This sleeve 13 has a generally axially extending portion 15 and a radially extending flange 16 which extends in a plane generally perpendicular to the axis of rotation of the axially extending portion 15. A wheel 17 having a rim 18 on its outer periphery and adapted to receive a tire for the wheel structureis connected to an axially extending central member 21 through a connecting radially extending annular flange 22.

The central portion of the radially extending annular flange 22 has a plurality of spaced openings 23 for receiving spaced studs 24 and more particularly a cylindrical portion 26 thereof. The spaced studs 24 also have reduced threaded portions 27 that are positioned in spaced apertures 28 of the flange 16 and are affixed thereto by nuts 29.

A two-piece composite rotor 30 is provided in the present invention having a brake shoe engaging member in the form of a brake disk 32 and an attaching hub 34. The attaching hub has a first radially extending flange 36, a second radially extending flange 38 and an interconnecting web 40 that extends in a direction generally parallel to the axis of rotation of the sleeve 13. The radially extending flange 36 has a plurality of spaced apertures 41 that receive the cylindrical portions 26 of the studs 24 so that the attaching hub 34 is removably mounted on these spaced studs as will be more thoroughly described later in the specification.

A wing nut 46 having an internally threaded portion 48 and an outer ramp portion 50 is employed to hold the wheel 17 and the rotor 30 on the spaced studs 24 by the engagement of the ramp portion 50 with a corresponding ramp portion 51 on the axially extending sleeve 21 of the wheel 17.

The rotatable disk portion 32 of the two-piece or composite rotor 30 that is adapted to be engaged by the brake shoes of the disk brake 11 comprises a first brake shoe engaging face 52 and a second brake shoe engaging face 54, and it has radially extending cooling slots 56 positioned therein to move cooling air radially outwardly through the disk as it is rotated during vehicle operations. Cooling air may enter these radially extending slots 56 by means of an annular opening 58 positioned around the inner periphery of the disk 32.

As previously stated, the attaching hub 34 has a radially extending flange 38 which is employed to attach the braking disk portion 32 of the two-piece or composite rotor 30 to the attaching hub 34. This is accomplished by means of spaced radially inwardly extending tabs 60 positioned about the inner periphery of the disk 32 that are positioned in engagement with the flange 38 at spaced intervals around the periphery of the disk 32. Any suitable attaching means may be employed to attach the inwardly extending tabs 60 to the radially extending flange 38 and it may take the form of machine screws 61.

The disk 32 has semicircular openings 62 positioned between the tabs 60 that provide, together with the annular opening 58 and the radially extending slots 56, spaced apertures in the braking disk 32 that extend from one braking face 52 to the other braking face 54.

The flange 38 is provided with recesses 65 at spaced positions thereof on either side of the tabs 60 to provide air-directing surfaces 66 that are spaced from the brake engaging surface 54 of the disk 32. This surface comprises a first portion 68 which is positioned generally parallel to the braking surface 54 and an intermediate portion 70 which is curved in a direction from a generally axial direction with respect to the rotor into the surface 68. As can best be seen by reference to FIG. 6, these recesses 65 are generally rectangular in configuration and overlap the semicircular apertures 62 in the disk 32 in a circumferential direction to provide generally rectangular channels for the direction of the cooling air.

Referring now to FIG. 2, it can be seen that the braking surface 54 of the braking disk 32 of the composite rotor 30 is positioned in spaced relationship to the radially extending flange 22 of the wheel 17 to form an air pocket where air circulation is impeded. This prevents proper cooling of the braking surface 54 of the braking disk 32. Conversely, the other braking surface 52 is exposed to the inner open area of the wheel and it is, therefore, exposed to moving air as the wheel and the rotor rotate during vehicle operations. The spaced openings through the rotor at the inner periphery thereof formed by the annular groove 58, the radially extending air pasages 56 and the semicircular openings 62 provide a means for moving the cooling air radially through the rotor, thereby providing a cooling action for it. The air-directing surfaces 66 formed on the flange 38 provide a means for directing this cooling air which moves in this radial direction through the recesses 65 and over the braking face 54 of the rotor 32.

Thus, the present invention provides a composite rotor to be used with a disk brake in which a disk which is adapted to be engaged by brake shoes on a disk brake may be easily and readily replaced as it wears or is otherwise thermally fatigued as the result of braking action. Moreover, the invention provides a means associated with the attaching means which attaches the disk to a member rotated by a rotatable hub for directing cooling air through the disk and over a face of the braking disk that is enclosed in a wheel structure and which would otherwise not receive proper amounts of cooling air.

Although the present invention may be most readily employed with braking arrangements for racing vehicles in which the braking disks are subjected to extremely high temperatures that cycle through wide ranges, it may also be readily employed in other types of vehicles in which disk brakes are employed to brake the wheels of a vehicle.

It can be readily appreciated also that the composite rotor 30 may be readily removed from the wheel structure by merely removing the wing nut 50 and lifting the wheel 17 and the composite rotor 30 from their mounting studs. Thereafter, the rotatable disk portion 32 may be removed from its attaching hub 34 by removing the screws 61 and a new rotatable disk may then be affixed to the attaching hub 34 by means of the screws 61.

It is to be understood, of course, that although a preferred embodiment of the invention has been shown and described, various modifications, substitutions and additions may be made thereto without departing from the spirit of the invention as encompassed in the attached claims.

What is claimed is:

1. A two-piece rotor for a disk brake comprising an attaching member adapted to be connected to a wheel, or the like, a disk member having a pair of axially spaced annular braking surfaces on opposite sides thereof, and a plurality of circumferentially spaced radially inwardly extending projections disposed between the planes of said braking surfaces and having spaces therebetween, and a flange on said attaching member removably fastened to said projections on one side of said disk member, said flange having a plurality of recesses open to the spaces between said projections, the spaces between said projections being uncovered on the other side of said disk member whereby air is free to flow axially into said openings and thence to said recesses, said recesses being positioned to direct air radially outwardly over the braking surface on said one side of said disk member.

2. The structure set forth in claim 1 in which each of said recesses has a first wall extending generally parallel to said braking surfaces and a second curved wall merging with said first wall and extending axially inwardly toward the plane of one of said braking surfaces.

3. The structure set forth in claim 1 wherein said disk member is provided with two axially spaced walls separated by circumferentially spaced ribs, each of said walls having one of said braking surfaces on the outer side thereof, said projections being in radial alignment with one of said walls.

4. The structure set forth in claim 1 wherein an associated wheel is disposed on said one side of said disk member.

References Cited
UNITED STATES PATENTS

| | | | |
|---|---|---|---|
| 2,369,328 | 2/1945 | Watts | 188—264 |
| 2,233,594 | 3/1941 | Eksergian | 188—218 |
| 2,255,024 | 9/1941 | Eksergian | 188—218 |
| 2,380,085 | 7/1945 | Tack et al. | 188—218 |
| 2,765,881 | 10/1956 | Pierce | 188—218 |

MILTON BUCHLER, *Primary Examiner.*

GEORGE E. A. HALVOSA, *Assistant Examiner.*